Feb. 10, 1925.  
J. H. LONGNECKER  
PET COCK EXTENSION DEVICE  
Filed Oct. 30, 1923  
1,525,817  
2 Sheets-Sheet 1

Witnesses:  
Virgil L. Mares  
George A. Gauss

Inventor  
Jacob Haldeman Longnecker  
By Joshua R. H. Potts  
his Attorney

Feb. 10, 1925.

J. H. LONGNECKER

PET COCK EXTENSION DEVICE

Filed Oct. 30, 1923   2 Sheets-Sheet 2

Witnesses:
Virgil L. Maret
George A. Gruss

Inventor
Jacob Haldeman Longnecker

By Joshua R H Potts
his Attorney

Patented Feb. 10, 1925.

1,525,817

UNITED STATES PATENT OFFICE.

JACOB HALDEMAN LONGNECKER, OF PHILADELPHIA, PENNSYLVANIA.

PET-COCK EXTENSION DEVICE.

Application filed October 30, 1923. Serial No. 671,675.

*To all whom it may concern:*

Be it known that I, JACOB HALDEMAN LONGNECKER, a citizen of the United States, residing at Philadelphia, in the county of Philadelphia and State of Pennsylvania, have invented certain new and useful Improvements in Pet-Cock Extension Devices, of which the following is a specification.

My invention relates to pet cock extension devices adapted for use on automobiles.

Automobiles, such as the Ford type, have oil cocks in the transmission casing whereby the level of the oil in the casing may be approximately ascertained. To ascertain the oil level it was necessary to stoop, reach under the automobile and turn these cocks on and off. This was a strenuous and dirty job.

The objects of my invention are to provide an extension device for pet cocks which will be within convenient reach of the user; which will not produce chattering or vibrating noises; which may be easily attached to an automobile, and which will be of simple and durable construction.

These objects, and other advantageous ends which will be described hereinafter, I attain in the following manner, reference being had to the accompanying drawings, in which—

Figure 1:
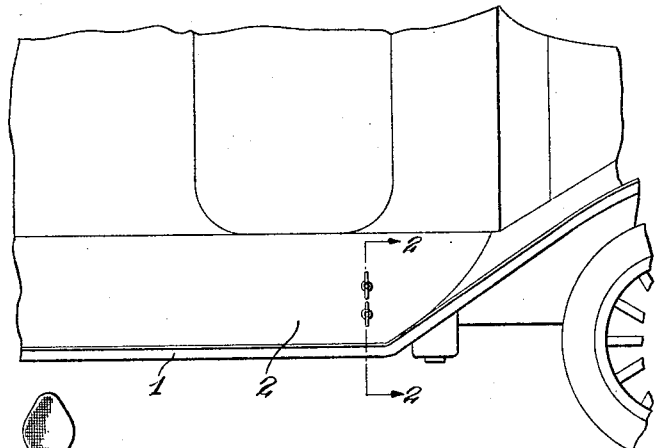
Figure 2:
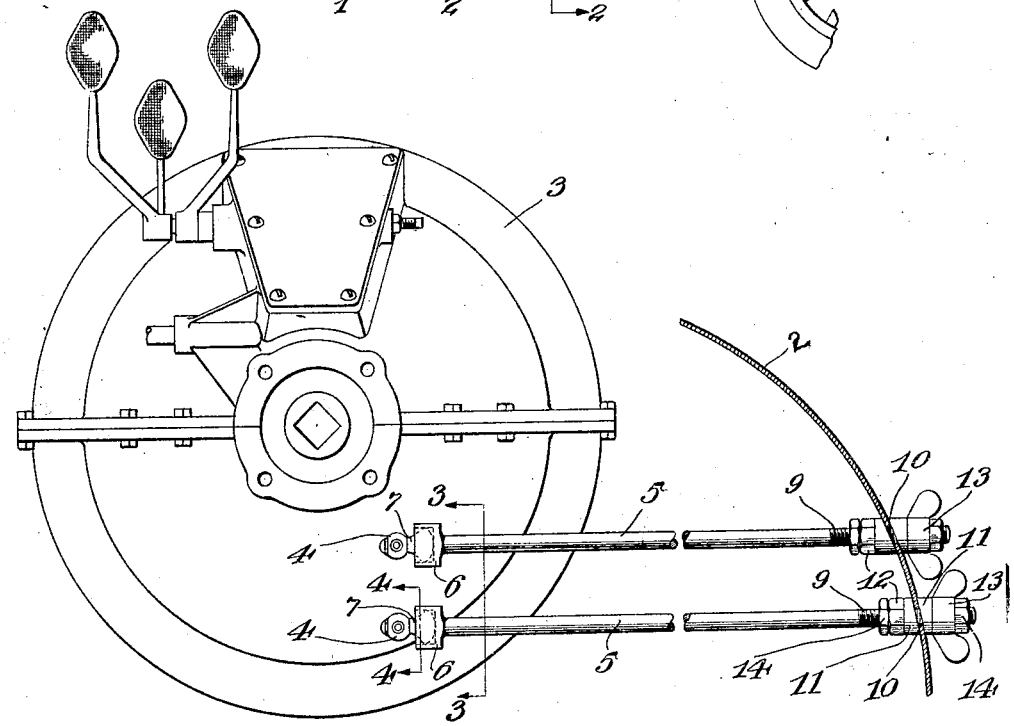
Figure 3:
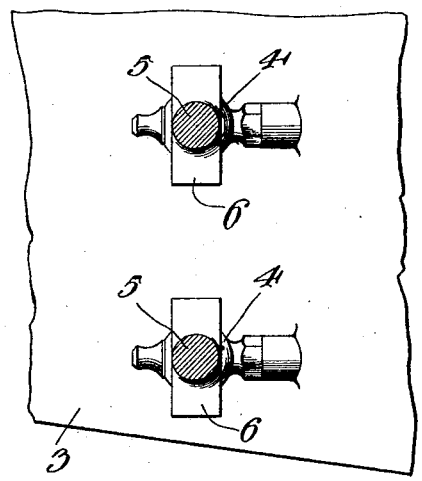
Figure 4:
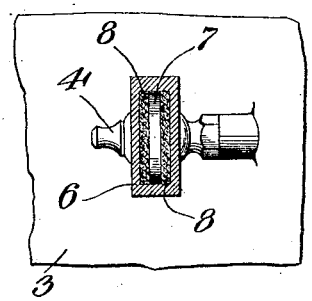
Figure 5:
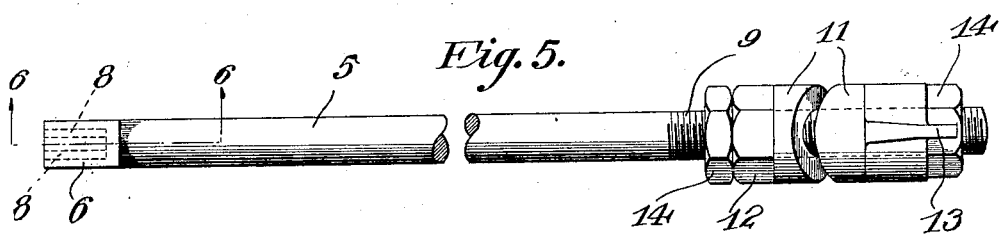
Figure 6:
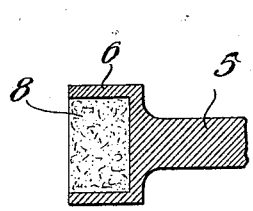
Figure 7:
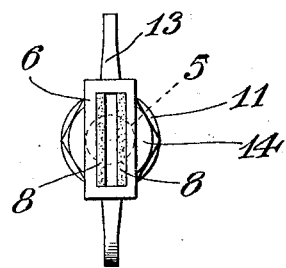

Figure 1 is a fragmentary side elevation of an automobile having my invention applied thereto, Figure 2 an enlarged section taken substantially on line 2—2 of Figure 1, certain parts of the automobile being omitted, Figure 3 an enlarged fragmentary section on line 3—3 of Figure 2, Figure 4 a section on line 4—4 of Figure 2, Figure 5 a plan view of the extension device shown in Figures 1 and 2, Figure 6 a section on line 6—6 of Figure 5, and Figure 7 an end view of Figure 5.

Referring to the drawings, 1 indicates the body of an automobile having a splash plate 2, and 3 the transmission casing having the oil cocks 4. My extension devices are connected to the oil cocks 4 and the splash plate 2 and as they are similar in construction but one will be described.

A rod 5 is provided with a socket 6 on one end, preferably of rectangular box shape, for receiving the turning part 7 of oil cocks 4. Cushioning pads 8 are placed within the sockets at opposite sides of the turning part 7 to prevent chattering or vibrating noises between the socket and part 7. The other end 9 of rod 5 is threaded and extends through a hole 10 in splash plate 2. Washers 11, of resilient material, are mounted on the threaded end 9 at opposite sides of the splash plate. Adjusting nuts 12 and 13 on the threaded end engage the washers 11 and adjust the position of rod 5 relative to splash plate 2. Lock nuts 14 on the threaded end lock the nuts 12 and 13 in position.

To install my improved extension device on an automobile, one of the lock nuts 14, nut 12 and one of the resilient washers 11 are slipped over the end 9 of the rod 5 and the end 9 passed through opening 10 in splash plate 2 until the socket 6 on the other end of rod 5 is clear of the turning part 7 on oil cock 4. The rod is then moved toward the oil cock so that the turning part 7 will fit between the cushioning pads 8 in the socket 6. Adjusting nut 12 is then turned until resilient washer 11 engages the splash plate, after which lock nut 14 is turned to lock the adjusting nut 12 in position. The other resilient washer 11 is then slipped over the end 9 of the rod which extends through the splash plate 2 and the adjusting nut 13 screwed on the end until the washer 11 engages the other side of splash plate 2. The other lock nut 14 is then screwed on the end 9 until it locks the nut 13 in position. The adjusting nut 13 may be of any suitable shape such as a thumb nut which affords a firm grip for turning the rod. The device is then ready for use.

To use the device for turning the oil cock on or off, thumb nut 13 is turned 90°. This will turn part 7 of the pet cock and the oil within the casing will flow through the cock. Thus the level of the oil may be approximately ascertained.

An extension device constructed and attached as above set forth will not produce chattering or vibrating noises at its connections with the oil cocks and the splash plate because the cushioning pads 8 and the resilient washers 11 absorb the vibrations. The device may be easily attached by merely drilling a pair of holes through the splash plate and its turning end is located within convenient reach of the user.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with the oil pet cock and splash plate of an automobile, a rod connected to the oil cock and bearing in the splash plate, and means for preventing endwise movement of the rod.

2. In combination with the oil pet cock and splash plate of an automobile, a rod having one end connected to the oil cock and the other end extended through the splash plate; means on the rod for preventing endwise movement thereof, and means on the rod for absorbing vibrations from the splash plate.

3. In combination with the oil pet cocks and splash plate of an automobile, a rod having a socket on one end adapted to receive the turning part of the pet cock and having its other end threaded and extending through the splash plate; resilient washers on the threaded end at opposite sides of the splash plate, and lock nuts on the threaded end for keeping the washers against the splash plate.

4. A device of the character described comprising a rod having a socket on one end adapted to receive the turning part of a pet cock and having its other end threaded; resilient washers on the threaded end adapted to be disposed at opposite sides of a splash plate, and lock nuts on the threaded part for keeping the washers in position, one of the nuts being a thumb nut.

5. A device of the character described comprising a rod having a socket on one end adapted to receive the turning part of a pet cock and having its other end threaded; cushioning pads within the socket; resilient washers on the threaded end adapted to be disposed at opposite sides of a splash plate, and lock nuts on the threaded part for keeping the washers in position.

6. A device of the character described comprising a rod having a rectangular box on one end adapted to receive the turning part of a pet cock and having its other end threaded; resilient washers on the threaded end adapted to be disposed at opposite sides of a splash plate, and lock nuts on the threaded part for keeping the washers in position.

In testimony whereof I have signed my name to this specification in the presence of two subscribing witnesses.

JACOB HALDEMAN LONGNECKER.

Witnesses:
GEORGE A. GRUSS,
CHAS. E. POTTS.